United States Patent [19]

Laval

[11] Patent Number: 4,776,912

[45] Date of Patent: Oct. 11, 1988

[54] PRINTING MACHINE INCORPORATING PRESSER CYLINDERS

[75] Inventor: Michel J. Laval, Rilly-la-Montagne, France

[73] Assignee: Productions Textiles et Plastiques de la Marne S.A., France

[21] Appl. No.: 438,797

[22] Filed: Nov. 3, 1982

[30] Foreign Application Priority Data

Nov. 5, 1981 [FR] France ................................ 81 20899

[51] Int. Cl.⁴ .......................... B31F 1/07; B32B 31/20
[52] U.S. Cl. .................................. 156/209; 156/553; 101/23; 101/32
[58] Field of Search ...................... 101/23, 24, 25, 22, 101/32; 156/219, 209, 553

[56] References Cited

U.S. PATENT DOCUMENTS

| 3,191,408 | 6/1965 | Bayan | 101/23 |
| 3,208,898 | 3/1960 | Chavannes et al. | 101/23 |
| 3,481,818 | 12/1969 | Wellen | 101/23 |
| 4,069,081 | 1/1978 | Drower et al. | 156/324 |
| 4,119,481 | 10/1978 | Beckley | 156/324 |
| 4,121,960 | 10/1978 | Focht | 156/219 |
| 4,289,559 | 10/1979 | Murphy | 156/324 |

FOREIGN PATENT DOCUMENTS 553248 2/1958 Canada ................................ 101/22
2726330 12/1978 Fed. Rep. of Germany ........ 101/23

OTHER PUBLICATIONS

A. W. Smith, *Elements of Physics*, 1948, pp. 58-59, McGraw-Hill Book Company, Inc.

Primary Examiner—Clifford D. Crowder
Attorney, Agent, or Firm—Lerner, David, Littenberg, Krumholz & Mentlik

[57] ABSTRACT

A machine incorporating presser cylinders for continuously making printed patterns or designs, in intaglio or in relief, on webs of supple material lined with synthetic foam. It comprises a die cylinder (1) mounted on fixed bearings (2) and driven at variable speed by a motor (3), a presser cylinder driven by a motor (8) mounted on bearings (5) fixed on articulated arms (6), moved by jacks (7). The webs of foam (9) and of fabric (11) are conducted towards the cylinders respectively by devices (10 and 12). A heating element (13) is disposed upstream of the cylinders. Rotary (14) and linear (15) sensors modulate the force of approach of the cylinders as a function of the rotation of the die cylinder. The different operational parameters are controlled by a process control (16).

10 Claims, 1 Drawing Sheet

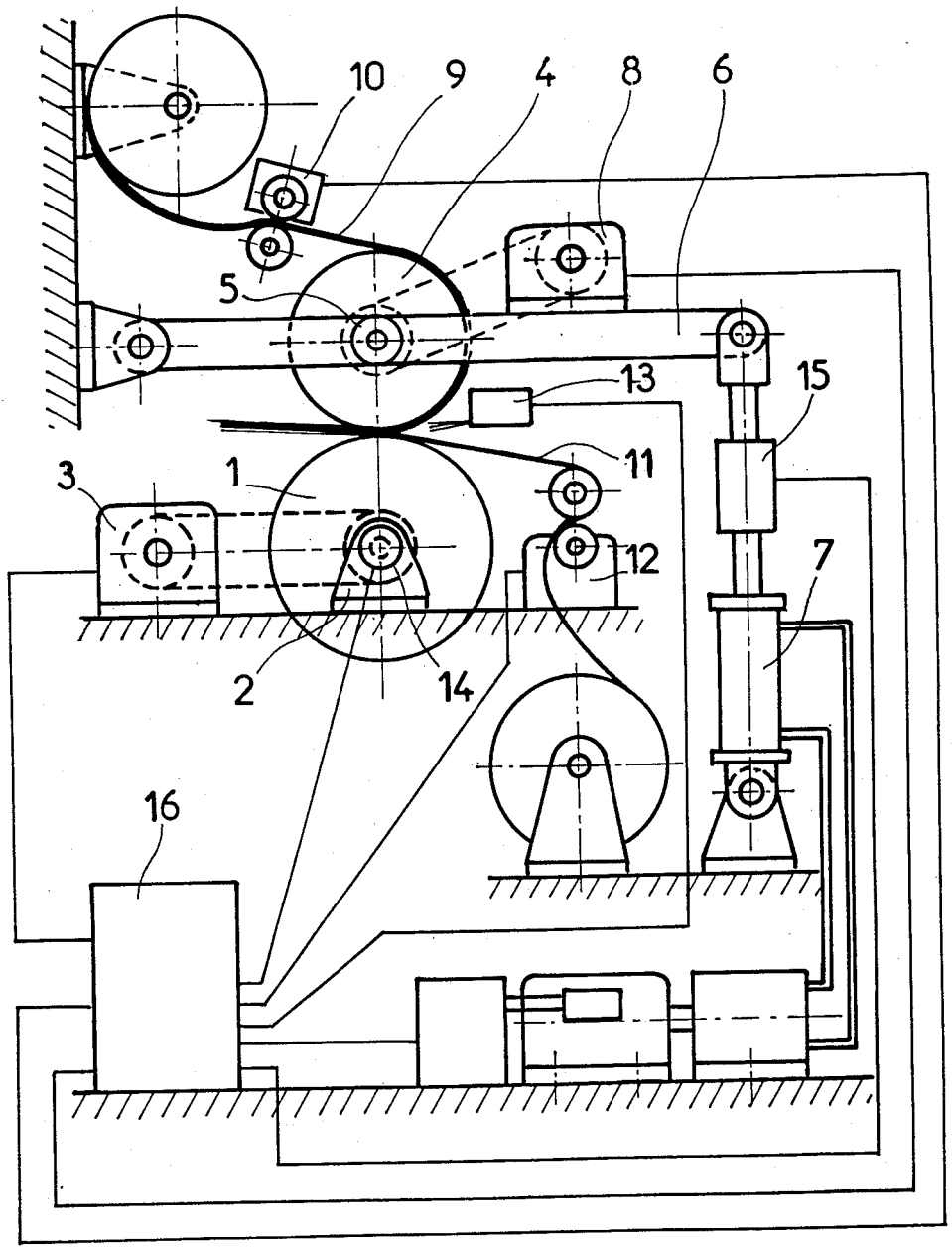

PRINTING MACHINE INCORPORATING PRESSER CYLINDERS

The present invention relates to a machine incorporating presser cylinders for continuously embossing or engraving, in intaglio or in relief, patterns or designs on webs of material lined with a synthetic foam.

It was heretofore possible to obtain, continuously, printed patterns or designs, in relief or intaglio, on webs of supple material lined with synthetic foam, by employing the so-called 'ribbing' process which consists in hollowing out grooves in the foam by means of heating elements and incorporating the fabric therein. This process makes it possible to obtain more or less close ribs whose section may vary depending on the shape of the heating element, but it enables only linear patterns to be obtained, disposed in the direction of advance of the web. Discontinuous patterns: rhombi, rectangles, circles, etc... may be obtained on a complex with a thickness of between 2 and 30 mm. formed by the juxtaposition of fabric, synthetic foam and a lining, using high frequency or discontinuous thermal welding, as, if a device incorporating presser cylinders is used, the pressure and consequently the depth of the impression, are inversely proportional to the length of the part of the pattern located on the same generatrix of the presser roller. This results in variations in relief of the pattern which are detrimental to the desired aesthetic effect and which compromise adherence of the whole.

The machine according to the invention makes it possible to overcome these drawbacks, as, in fact, the pressure is thereby maintained at a determined value, whatever the length and shape of the print.

This machine is mainly characterized in that the presser cylinders are subjected to a force of approach proportional to the length and shape of the relief to be obtained; the speed of rotation of the presser rollers varies as a function of the length and the shape of the relief to be obtained; the deformation of the foam and the adherence of the fabric thereon are obtained by a heating element disposed upstream of the presser rollers at a distance varying as a function of the speed of advance of the webs; and the intensity of the heating varies as a function of the speed of advance of the webs and the webs constituting the complex are conducted at variable speed.

The force of approach of the presser cylinders varies depending on the advance of the pattern between the rollers, so as permanently to maintain the pressure corresponding to the production of the desired pattern. The approach of the presser cylinders is obtained via jacks acting on floating bearings.

The force of approach of the presser cylinders, the speed of rotation thereof, the speed of supply of the webs constituting the complex, as well as the distance and intensity of the source of heat vary dependently and automatically in accordance with a process previously set up as a function of the pattern to be made.

The source of heat used in the heating element is a gas burner element, an infrared emitter, a micro-wave emitter or an ultra-sound emitter.

BRIEF DESCRIPTION OF THE DRAWING

Other features and advantages will appear in the following description of a machine made according to the invention, given by way of non-limiting example, with reference to the accompaying drawing which shows a schematic side view of the whole of said machine.

With reference to the drawing, it will be noted that this machine is mainly composed of a die cylinder 1 mounted on fixed bearings 2, driven by a motor 3, on which abuts a presser cylinder 4 mounted on floating bearings 5 fixed on articulated arms 6 actuated by jacks 7 driven in rotation by a motor 8. The web of synthetic foam 9 is conducted towards the cylinders by a device 10 driven at variable speed. The web of fabric 11 is conducted towards cylinders 1 and 4 by a device 12 driven at variable speed. The heating element 13 is disposed upstream of the cylinders 1 and 4, at a variable distance. A rotary sensor 14 is mounted at the end of the shaft of the die cylinder 1. A linear sensor 15 is interposed between the rod of the jack 7 and the free end of the articulated arm 6. The motors for driving the cylinders, the supply devices and the heating element, the heating element itself, the control box of the hydraulic unit which supplies the jacks and the sensors, are connected to a process control cabinet 16.

As will be seen, the force of approach of the presser cylinder against the die cylinder is modulated by the jacks 7, via the articulated arms 6, as a function of the rotation of the die cylinder 1, via the rotary sensor 14 and the process control 16.

The intensity of the source of heat of the heating element 13, as well as its distance with respect to the cylinders 1 and 4, are modulated as a function of the rotation of the die cylinder 1 via the rotary sensor 14 and the process control 16.

The speed of rotation of the presser cylinders as well as the respective speeds of supply of the fabric and the synthetic foam vary as a function of the rotation of the die cylinder via the rotary sensor 14 and the process control 16.

It is thus possible to obtain, at each instant, a pressure and plasticity of the foam adapted with precision to the length and relief of that part of the pattern located on the generatrix of contact of the rollers, in order to ensure that the relief is constant over the whole pattern.

The machine according to the invention may be used whenever any relief is to be obtained, in intaglio or in relief, on a complex made by superposition of web of supple material and synthetic foam. It may be used, in particular, in the domain of sheathing or packing.

Particularly advantageous applications thereof exist in paddings of seats and doors of automobiles.

I claim:

1. Apparatus for the continuous application of patterns having predetermined lengths and shapes onto webs of flexible sheet material lined with a synthetic foam backing sheet comprising a rotatable die cylinder, a rotatable presser cylinder proximate to said rotatable die cylinder so as to provide a printing zone between said rotatable die cylinder and said rotatable presser cylinder, presser cylinder movement means for altering the location of said presser cylinder with respect to said die cylinder so that the distance between said presser cylinder and said die cylinder may be adjusted and the force applied to said printing zone by said presser cylinder may be varied during use, flexible sheet material feed means for feeding said flexible sheet material to said presser clinder and into said printing zone, synthetic foam backing sheet feed means for feeding said synthetic foam backing sheet to said die cylinder and into said printing zone, die cylinder control means for altering the rate of rotation of said die cylinder, presser cylinder control means for altering the rate of rotation of said presser cylinder, heating means located upstream of said printing zone for supplying heat to said printing zone in order to facilitate deformation of said synthetic foam backing sheet and to adhere said flexible sheet material thereto, and heating means control means for adjusting the intensity of said heat supplied by said heating means to said printing zone, whereby said force applied by said presser cylinder to said printing zone, said rate of rotation of said die cylinder, and said rate of rotation of said presser cylinder, may be continuously altered during use of said apparatus in order to produce said patterns having said predetermined lengths and shapes on said webs.

2. The apparatus of claim 1 including synthetic foam control means for altering the rate that said synthetic foam backing sheet feed means feeds said synthetic foam backing sheet to said printing zone, and flexible sheet control means for altering the rate that said flexible sheet material feed means feeds said flexible sheet to said printing zone.

3. The apparatus of claim 1 or 2 wherein said heating means control means includes means for adjusting the distance between said heating means and said printing zone.

4. The apparatus of claim 1 or 2 wherein said presser cylinder includes presser cylinder bearing means, and wherein said presser cylinder bearing means are adjustably mounted with respect to said die cylinder.

5. The apparatus of claim 4 wherein said presser cylinder bearing means are mounted on an articulated arm having a first end and a second end, said presser cylinder bearing means being mounted between said first and second ends of said articulated arm, said first end of said articulated arm being mounted at a fixed location, and said second end of said articulated arm being adjustably mounted whereby adjustment of the location of said second end of said articualated arm alters the distance between said presser cylinder and said die cylinder.

6. The apparatus of claim 5 including jack means for adjusting said location of said second end of said articulated arm.

7. The apparatus of claim 2 including process control means for controlling said presser cylinder movement means, said synthetic foam control means, said flexible sheet control means, and said heating means control means in accordance with the nature of said pattern to be applied to said webs.

8. A process for the continuous application of patterns having predetermined lengths and shapes onto webs of flexible sheet material lined with a synthetic foam backing sheet comprising feeding said flexible sheet material to a printing zone between a rotatable die cylinder and a rotatable presser cylinder, simultaneously feeding said synthetic foam backing sheet to said printing zone, applying heat to said printing zone during use in order to facilitate deformation of said synthetic foam backing sheet and adhere said flexible sheet material therein, altering the location of said presser cylinder with respect to said die cylinder so that the distance between said presser cylinder and said die cylinder may be adjusted during use and the force applied to said printing zone by said presser cylinder can be varied during such use, altering the rate of rotation of said die cylinder during use, altering the rate of rotation of said presser cylinder during use, and altering the intensity of heat applied to said printing zone in order to produce said pattern having said predetermined lengths and shaped on said web.

9. The process of claim 8 wherein adjusting the intensity of said heat comprises adjusting the distance between said heating means and said printing zone.

10. The process of claim 8 wherein said steps of altering the location of said presser cylinder with respect to said die cylinder, altering the rate of rotation of said presser cylinder, altering the rate of rotation of said die cylinder, and altering the intensity of said heat applied to said printing zone, are conducted in response to said pattern having said predetermined lengths and shaped to be applied to said webs

* * * * *

UNITED STATES PATENT AND TRADEMARK OFFICE
CERTIFICATE OF CORRECTION

PATENT NO.   : 4,776,912
DATED        : October 11, 1988
INVENTOR(S)  : Laval

It is certified that error appears in the above-identified patent and that said Letters Patent is hereby corrected as shown below:

Column 3, line 41, "articualated" should read -- articulated --.
Column 4, line 20, "therein" should read -- thereto --.
Column 4, line 28, after "of" insert -- said --.
Column 4, line 40, "shaped" should read --shapes--.

Signed and Sealed this

Ninth Day of May, 1989

Attest:

DONALD J. QUIGG

*Attesting Officer*                    *Commissioner of Patents and Trademarks*